US008510175B2

(12) United States Patent
Walker et al.

(10) Patent No.: US 8,510,175 B2
(45) Date of Patent: *Aug. 13, 2013

(54) SYSTEM TO PROVIDE A POSTING PAYMENT AMOUNT AS A CREDIT FOR PURCHASES

(75) Inventors: Jay S. Walker, Ridgefield, CT (US); Andrew S. Van Luchene, New York, NY (US); Deirdre O'Shea, Orinda, CA (US); Geoffrey M. Gelman, Stamford, CT (US); Dean P. Alderucci, Stamford, CT (US)

(73) Assignee: eBay Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/434,253

(22) Filed: Mar. 29, 2012

(65) Prior Publication Data

US 2012/0185313 A1  Jul. 19, 2012

Related U.S. Application Data

(63) Continuation of application No. 11/776,164, filed on Jul. 11, 2007, which is a continuation of application No. 10/189,310, filed on Jul. 2, 2002, now Pat. No. 7,251,620, which is a continuation-in-part of application No. 09/285,472, filed on Apr. 2, 1999, now Pat. No. 6,415,264, which is a continuation-in-part of application No. 08/964,967, filed on Nov. 5, 1997, now Pat. No. 6,108,369, and a continuation-in-part of application No. 08/889,319, filed on Jul. 8, 1997, now Pat. No. 6,085,169.

(51) Int. Cl.
*G06Q 30/00* (2012.01)

(52) U.S. Cl.
USPC .............. 705/26.3; 705/14.71; 705/14.73; 705/14.39; 705/400

(58) Field of Classification Search
USPC ................................. 705/14.3, 26.3
See application file for complete search history.

(56) References Cited

U.S. PATENT DOCUMENTS

| | | | |
|---|---|---|---|
| 3,573,747 A | 4/1971 | Adams et al. | |
| 3,581,072 A | 5/1971 | Nymeyer | |
| 4,833,606 A | 5/1989 | Iwasawa et al. | |
| 4,833,607 A | 5/1989 | Dethloff et al. | |
| 5,034,807 A | 7/1991 | Von Kohorn | |
| 5,227,874 A * | 7/1993 | Von Kohorn | 705/7.32 |

(Continued)

FOREIGN PATENT DOCUMENTS

EP    0952536 A1    10/1999

OTHER PUBLICATIONS

"U.S. Appl. No. 09/285,472, Non Final Office Action mailed Mar. 28, 2001", 8 pgs.

(Continued)

*Primary Examiner* — Scott Zare
*Assistant Examiner* — Talia Crawley
(74) *Attorney, Agent, or Firm* — Schwegman, Lundberg & Woessner, P.A.

(57) ABSTRACT

Products and processes are provided in which information is received for a post relating to an item to be sold via a posting site. A posting payment amount relating to the post is determined. The posting amount is provided as a credit for purchases. For example, the credit may be a credit that is usable for purchases via the posting site.

30 Claims, 11 Drawing Sheets

(56) References Cited

U.S. PATENT DOCUMENTS

| | | | |
|---|---|---|---|
| 5,283,731 A | | 2/1994 | Lalonde et al. |
| 5,297,026 A | * | 3/1994 | Hoffman .................. 705/14.18 |
| 5,414,621 A | | 5/1995 | Hough |
| 5,537,314 A | * | 7/1996 | Kanter ..................... 705/14.13 |
| 5,592,375 A | * | 1/1997 | Salmon et al. ................ 705/321 |
| 5,608,620 A | * | 3/1997 | Lundgren ..................... 705/1.1 |
| 5,619,558 A | | 4/1997 | Jheeta |
| 5,664,111 A | | 9/1997 | Nahan et al. |
| 5,715,402 A | | 2/1998 | Popolo |
| 5,732,400 A | | 3/1998 | Mandler et al. |
| 5,745,882 A | | 4/1998 | Bixler et al. |
| 5,758,328 A | | 5/1998 | Giovannoli |
| 5,794,207 A | | 8/1998 | Walker et al. |
| 5,794,210 A | | 8/1998 | Goldhaber et al. |
| 5,794,219 A | | 8/1998 | Brown |
| 5,809,481 A | | 9/1998 | Baron et al. |
| 5,819,092 A | | 10/1998 | Ferguson et al. |
| 5,825,881 A | | 10/1998 | Colvin, Sr. |
| 5,826,244 A | | 10/1998 | Huberman |
| 5,835,896 A | | 11/1998 | Fisher et al. |
| 5,845,265 A | | 12/1998 | Woolston |
| 5,893,075 A | | 4/1999 | Plainfield et al. |
| 5,940,471 A | | 8/1999 | Homayoun |
| 5,940,834 A | | 8/1999 | Pinard et al. |
| 5,999,908 A | * | 12/1999 | Abelow ..................... 705/7.32 |
| 6,012,045 A | | 1/2000 | Barzilai et al. |
| 6,049,777 A | * | 4/2000 | Sheena et al. ................ 705/7.32 |
| 6,052,717 A | | 4/2000 | Reynolds et al. |
| 6,112,186 A | | 8/2000 | Bergh et al. |
| 6,202,051 B1 | * | 3/2001 | Woolston ..................... 705/26.3 |
| 6,219,696 B1 | | 4/2001 | Wynblatt et al. |
| 6,253,188 B1 | * | 6/2001 | Witek et al. ................ 705/14.54 |
| 6,415,264 B1 | | 7/2002 | Walker et al. |
| 6,460,036 B1 | * | 10/2002 | Herz ............................ 707/748 |
| 6,502,717 B1 | | 1/2003 | Wolfe et al. |
| 6,502,745 B1 | | 1/2003 | Stimson et al. |
| 6,606,744 B1 | | 8/2003 | Mikurak |
| 7,133,834 B1 | * | 11/2006 | Abelow ..................... 705/7.32 |
| 7,251,620 B2 | | 7/2007 | Walker et al. |
| 7,613,633 B1 | * | 11/2009 | Woolston ..................... 705/26.3 |
| 2001/0014868 A1 | | 8/2001 | Herz et al. |
| 2002/0032653 A1 | | 3/2002 | Schutzer |
| 2002/0072978 A1 | | 6/2002 | Odom et al. |
| 2007/0265938 A1 | | 11/2007 | Walker et al. |
| 2008/0004952 A1 | | 1/2008 | Koli |
| 2008/0015949 A1 | | 1/2008 | Walker et al. |
| 2008/0015972 A1 | | 1/2008 | Walker et al. |
| 2012/0191520 A1 | | 7/2012 | Walker et al. |
| 2012/0197694 A1 | | 8/2012 | Walker et al. |
| 2012/0197766 A1 | | 8/2012 | Walker et al. |

OTHER PUBLICATIONS

"U.S. Appl. No. 09/285,472, Notice of Allowance mailed Feb. 14, 2002", 8 pgs.

"U.S. Appl. No. 09/285,472, Response filed Jun. 28, 2001 to Non Final Office Action mailed Mar. 28, 2001", 8 pgs.

"U.S. Appl. No. 10/189,310, Final Office Action mailed Dec. 4, 2006", 11 pgs.

"U.S. Appl. No. 10/189,310, Non Final Office Action mailed May 16, 2006", 9 pgs.

"U.S. Appl. No. 10/189,310, Non Final Office Action mailed Dec. 29, 2005", 8 pgs.

"U.S. Appl. No. 10/189,310, Notice of Allowance mailed May 3, 2007", 10 pgs.

"U.S. Appl. No. 10/189,310, Response filed Mar. 5, 2007 to Final Office Action mailed Dec. 4, 2006", 3 pgs.

"U.S. Appl. No. 10/189,310, Response filed Apr. 28, 2006 to Non Final Office Action mailed Dec. 29, 2005", 4 pgs.

"U.S. Appl. No. 10/189,310, Response filed Oct. 16, 2006 to Non Final Office Action mailed May 16, 2006", 5 pgs.

"U.S. Appl. No. 10/189,310, Response filed Dec. 1, 2005 to Restriction Requirement mailed Nov. 28, 2005", 5 pgs.

"Application U.S. Appl. No. 10/189,310, Restriction Requirement mailed 11-28-05", 6 pgs.

"U.S. Appl. No. 11/762,834, Examiner Interview Summary mailed Sep. 9, 2009", 2 pgs.

"U.S. Appl. No. 11/762,834, Final Office Action mailed Jan. 26, 2009", 13 pgs.

"U.S. Appl. No. 11/762,834, Non Final Office Action mailed Jun. 19, 2008", 10 pgs.

"U.S. Appl. No. 111762,834, Response filed Feb. 25, 2008 to Restriction Requirement mailed Jan. 23, 2008", 15 pgs.

"U.S. Appl. No. 11/762,834, Response filed Oct. 20, 2008 to Non Final Office Action mailed Jun. 19, 2008", 13 pgs.

"U.S. Appl. No. 11/762,834, Restriction Requirement mailed Jan. 23, 2008", 6 pgs.

"U.S. Appl. No. 11/776,164, Final Office Action mailed Mar. 15, 2012", 13 pgs.

"U.S. Appl. No. 11/776,164, Final Office Action mailed Mar. 21, 2011", 12 pgs.

"U.S. Appl. No. 11/776,164, Non Final Office Action mailed Aug. 18, 2010", 13 pgs.

"U.S. Appl. No. 11/776,164, Non Final Office Action mailed Oct. 6, 2011", 12 pgs.

"U.S. Appl. No. 11/776,164, Pre-Appeal Brief Request filed Jun. 14, 2012", 5 pgs.

"U.S. Appl. No. 11/776,164, Response filed Feb. 6, 2012 to Non Final Office Action mailed Oct. 6, 2011", 17 pgs.

"U.S. Appl. No. 11/776,164, Response filed Jun. 20, 2011 to Final Office Action mailed Mar. 21, 2011", 19 pgs.

"U.S. Appl. No. 11/776,164, Response filed Dec. 19, 2010 to Non Final Office Action mailed Autg. 18, 2010", 19 pgs.

"Application U.S. Appl. No. 11/776,190, Non Final Office Action mailed Jun. 23, 2010", 13 pgs.

"U.S. Appl. No. 13/434,466, Non Final Officer Action mailed Jul. 3, 2012", 10 pgs.

"Auction Universe—Registration", [Online]. Retrieved from the Internet: <http//www.auctionuniverse.com/au/.. v=9H8S5P1X5B6J5G1U9Z7D1054&idx=4, (Accessed: Jan. 20, 1999), 3 pgs.

"BidFind (Adding the Power)", [Online]: Retrieved from the Internet: <http//www.bidfind.com/af/af-abouthtml>, (Accessed: Feb. 18, 1999), 1 pg.

"eBay—Your Personal Trading Community", [Online]. Retrieved from the Internet: <http://www.ebay.com>, (Accessed: Feb. 18, 1999), 1 pg.

"eBay New Item", [Online]: Retrieved from the Internet: <http://pages.ebay.com/aw/newitem.html>, (Accessed: Feb. 18, 1999), 4 pgs.

"eBay User Agreement—Fees and Credits", [Online]. Retrieved from the Internet: <http://pages.ebay.com/aw/agreement-fees.html>, (Accessed: Feb. 18, 1999), 4 pgs.

"ExperTelligence Releases Online Auction Comparison for WebData com", PR Newswire, Section: Financial News, (Dec. 30, 1998), 2 pgs.

"Information on the Pawn Industry", [Online]. Retrieved from the Internet: <http://pages.prodigy.net/goodtrader/infopawn.html>, (Accessed: Aug. 1, 2001), 5 pgs.

"Just Glass Auction Rules", [Online]. Retrieved from the Internet: <http://justglass.com/docs/Seller_Info.html>, (Accessed: Feb. 20, 1999), 1 pg.

"Netcollect.com . . . Where the World Shops Collectibles!", [Online]. Retrieved from the Internet: <http//auctionnetcollect.com/cgi- . . . how_page.p1?page>, (Accessed: Feb. 18, 1999), 1 pg.

"US Pawn and Sirco International Announce Agreement on Development and Launch of Internet Auction Site", Business Wire, (Mar. 18, 1999), 2 pgs.

"Welcome to Just Glass Auction", [Online]. Retrieved from the Internet: <http://justglass.com/main.cfm>, (Accessed: Feb. 18, 1999), 2 pgs.

"Welcome to the New Revolution in Auctioning!", Netcollect.com, [Online]. Retrieved from the Internet: <http://www.netcollect.com/newhome/new-bottom.html>, (Accessed: Feb. 18, 1999), 3 pgs.

"World-Wide Collectors Digest—You . . . ntasy Football phone cards tickets", [Online]. Retrieved from the Internet: <http://www/wwcd.com/home.html>, (Accessed: Feb. 18, 1999), 3 pgs.

Edry, Sandy Lawrence, "Cyberscope: High-Tech Hock", Newsbytes, (Mar. 19, 1999), 2 pgs.

Jaskiewicz, Stanley, "Bidding Auctioneers: Negotiating an Agreement", Trusts & Estates, vol. 130 (Jun. 6, 1991), 2 pgs.

Klemperer, Paul, "Auction Theory: A Guide to the Literature", Journal of Economic Surveys, vol. 13(3), Jul. 1999, (May 1999), 227-286.

"U.S. Appl. No. 11/776,164, Decision on Pre-Appeal Brief Request mailed Jul. 27, 2012", 2 pgs.

"U.S. Appl. No. 11/776,164, Non Final Office Action mailed Nov. 13, 2012", 12 pgs.

"U.S. Appl. No. 13/434,161, Non Final Office Action mailed Aug. 30, 2012", 16 pgs.

"U.S. Appl. No. 13/434,184, Examiner Interview Summary mailed Oct. 11, 2012", 3 pgs.

"U.S. Appl. No. 13/434,184, Non Final Office Action mailed Aug. 20, 2012", 10 pgs.

"U.S. Appl. No. 13/434,184, Response filed Nov. 12, 2012 to Non Final Office Action mailed Aug. 20, 2012". 8 pgs.

"U.S. Appl. No. 13/434,187, Non Final Office Action mailed Aug. 31, 2012", 13 pgs.

"U.S. Appl. No. 13/434,208, Examiner Interview Summary mailed Oct. 11, 2012", 3 pgs.

"U.S. Appl. No. 13/434,208, Non Final Office Action mailed Aug. 23, 2012", 11 pgs.

"U.S. Appl. No. 13/434,208, Response filed Nov. 20, 2012 to Non Final Office Action mailed Aug. 23, 2012", 10 pgs.

"U.S. Appl. No. 13/434,231, Non Final Office Action mailed Aug. 31, 2012", 13 pgs.

"U.S. Appl. No. 13/434,285, Non Final Office Action mailed Aug. 30, 2012", 14 pgs.

"U.S. Appl. No. 13/434,410, Examiner Interview Summary mailed Oct. 9, 2012", 3 pgs.

"U.S. Appl. No. 13/434,410, Non Final Office Action mailed Aug. 2, 2012", 9 pgs.

"U.S. Appl. No. 13/434,466 , Response filed Oct. 3, 2012 to Non Final Office Action mailed Jul. 3, 2012", 7 pgs.

"U.S. Appl. No. 13/434,466, Examiner Interview Summary mailed Oct. 11, 2012", 3 pgs.

"U.S. Appl. No. 13/434,410, Response filed Nov. 2, 2012 to Non Final Office Action mailed Aug. 2, 2012", 10 pgs.

"U.S. Appl. No. 11/776,164, Response filed Jan. 12, 2013 to Non Final Office Action mailed Nov. 13, 2012", 18 pgs.

"U.S. Appl. No. 13/434,161, Final Office Action mailed Jan. 10, 2013". 7 pgs.

"U.S. Appl. No. 13/434,161, Notice of Allowance mailed Mar. 25, 2013", 10 pgs.

"U.S. Appl. No. 13/434,161, Response filed Feb. 19, 2013 to Final Office Action mailed Jan. 10, 2013", 8 pgs.

"U.S. Appl. No. 13/434,161, Response filed Nov. 27, 2012 to Non Final Office Action mailed Aug. 30, 2012", 9 pgs.

"U.S. Appl. No. 13/434,184, Non Final Office Action mailed Mar. 15, 2013", 17 pgs.

"U.S. Appl. No. 13/434,187 , Response filed Feb. 19, 2013 to Final Office Action mailed Jan. 8, 2013", 7 pgs.

"U.S. Appl. No. 13/434,187 , Response filed Nov. 27, 2012 to Non Final Office Action mailed Aug. 31, 2012", 12 pgs.

"U.S. Appl. No. 13/434,187, Final Office Action mailed Jan. 8, 2013", 7 pgs.

"U.S. Appl. No. 13/434,187, Notice of Allowance mailed Mar. 2, 2013", 13 pgs.

"U.S. Appl. No. 13/434,208, Non Final Office Action mailed Mar. 13, 2013", 18 pgs.

"U.S. Appl. No. 13/434,231 , Response filed Nov. 27, 2012 to Non Final Office Action mailed Aug. 31, 2012", 10 pgs.

"U.S. Appl. No. 13/434,231, Examiner Interview Summary mailed Apr. 5, 2013", 3 pgs.

"U.S. Appl. No. 13/434,231, Final Office Action mailed Jan. 10, 2013", 11 pgs.

"U.S. Appl. No. 13/434,285 , Response filed Nov. 27, 2012 to Non Final Office Action mailed Aug. 30, 2012", 10 pgs.

"U.S. Appl. No. 13/434,285, Examiner Interview Summary mailed Apr. 14, 2013", 3 pgs.

"U.S. Appl. No. 13/434,285, Final Office Action mailed Jan. 7, 2013", 15 pgs.

"U.S. Appl. No. 13/434,410, Final Office Action mailed Feb. 28, 2013", 13 pgs.

"U.S. Appl. No. 13/434,231, Response filed May 9, 2013 to Final Office Action mailed Jan. 10, 2013", 10 pgs.

"U.S. Appl. No. 13/434,285, Non Final Office Action mailed Apr. 25, 2013", 7 pgs.

"U.S. Appl. No. 13/434,285, Response filed Apr. 8, 2013 to Final Office Action mailed Jan. 7, 2013", 10 pgs.

"U.S. Appl. No. 13/434,285, Response filed May 8, 2013 to Non Final Office Action mailed Apr. 25, 2013", 6 pgs.

"U.S. Appl. No. 11/776,164, Final Office Action mailed Jun. 5, 2013", 14 pgs.

"U.S. Appl. No. 13/434,184, Response filed Jun. 16, 2013 to Non Final Office Action mailed Mar. 15, 2013", 11 pgs.

"U.S. Appl. No. 13/434,208, Response filed Jun. 13, 2013 to Non Final Office Action mailed Mar. 13, 2013", 11 pgs.

"U.S. Appl. No. 13/434,231, Non Final Office Action mailed May 23, 2013", 7 pgs.

"U.S. Appl. No. 13/434,285, Non Final Office Action mailed Jun. 17, 2013", 14 pgs.

"U.S. Appl. No. 13/434,410, Response filed Jun. 14, 2013 to Final Office Action mailed Feb. 28, 2013", 16 pgs.

"U.S. Appl. No. 13/434,466, Final Office Action mailed May 21, 2013", 13 pgs.

* cited by examiner

| NAME 310 | FINANCIAL ACCOUNT IDENTIFIER 320 | SATISFIED BUYERS 330 | UNSATISFIED BUYERS 340 | REPUTATION PERCENTAGE 350 |
|---|---|---|---|---|
| HOLLY SELLER | 1111-1111-1111-1111 | 18 | 1 | 94.7% |
| JOHN SMITH | 222-2222-2222-2222 | 6 | 2 | 75.0% |

| | ITEM 1 | ITEM 2 | ITEM n |
|---|---|---|---|
| ITEM ID | | | |
| ITEM CLASS | | | |
| ITEM TYPE | | | |
| GRADE | | | |
| PERIPHERAL 1 | | | |
| PERIPHERAL 2 | | | |
| PERIPHERAL n | | | |
| EXPECTED SELLING PRICE | | | |
| FLOOR PRICE | | | |
| INITIAL BID | | | |
| TOTAL NO. OF BIDS | | | |
| TOTAL TIME OF AUCTION | | | |
| FINAL BID AMOUNT | | | |

FIG. 4

| ITEM CLASS 710 | PERIPHERAL 1 720 | PERIPHERAL 2 730 | PERIPHERAL 3 740 |
|---|---|---|---|
| BOOK | LEATHER BINDING + $18.00 | SIGNED (LIVING) + $15.00 | SIGNED (DEAD) + $36.00 |
| CAMERA | CASE + $8.00 | FLASH + $22.00 | TRIPOD + $17.00 |
| WATCH | LEATHER BAND + $17.00 | ORIGINAL BAND + $12.00 | NONE |

FIG. 7

| PRICE FLOOR 810 | HISTORIC SALES 820 | COMMISSION PERCENTAGE 830 | POSTING PAYMENT AMOUNT 840 |
|---|---|---|---|
| $200.00 | 80% | 10% | $6.00 |
| $250.00 | 65% | 10% | $6.25 |
| $300.00 | 40% | 10% | $2.00 |

SYSTEM TO PROVIDE A POSTING PAYMENT AMOUNT AS A CREDIT FOR PURCHASES

CLAIM OF PRIORITY

This application is a continuation of U.S. patent application Ser. No. 11/776,164 filed Jul. 11, 2007; which is a continuation of U.S. patent application Ser. No. 10/189,310 filed Jul. 2, 2002, which issued as U.S. Pat. No. 7,251,620 on Jul. 31, 2007; which is a continuation-in-part of U.S. patent application Ser. No. 09/285,472, filed Apr. 2, 1999, which issued as U.S. Pat. No. 6,415,264 on Jul. 2, 2002; which is a continuation-in-part of U.S. patent application Ser. No. 08/964,967 filed Nov. 5, 1997, which issued as U.S. Pat. No. 6,108,369 on Aug. 22, 2000, and U.S. patent application Ser. No. 08/889,319 filed Jul. 8, 1997, which issued as U.S. Pat. No. 6,085,169 on Jul. 4, 2000; all of which applications are incorporated by reference herein in their entirety.

BACKGROUND OF THE INVENTION

The present invention relates to the sale of products. In particular, the present invention relates to a system and method for determining a posting payment amount.

In various types of commerce and other transactions, products (e.g. goods, services and/or opportunities) are advertised, or "posted", on a Web site or other medium. One type of transaction is an advertisement or offer of a product for sale. The product may be advertised for sale at a fixed price or some other price, such as a price that is set to be the highest amount bid by a bidder in an auction.

Other types of transaction include, but are not limited to, (i) a resume displayed, e.g., on a web site to solicit job offers or job opportunities for a person; (ii) a personal description displayed, e.g., on a web site to solicit dates and other personal interaction for a person; and (iii) feedback or opinions made available, including but not limited to personal opinions of previously purchased products, or personal opinions of others with whom business has been conducted.

In such systems it can be advantageous to encourage the posting of a product, such as an item for sale, a resume, a personal description or opinions.

BRIEF DESCRIPTION OF THE DRAWINGS

FIG. 4 is a tabular representation of a portion of the item database shown in FIG. 2 according to an embodiment of the present invention.

FIG. 7 is a tabular representation of a peripheral pricing portion of the posting database shown in FIG. 2 according to an embodiment of the present invention.

DETAILED DESCRIPTION OF THE INVENTION

Figure 1:
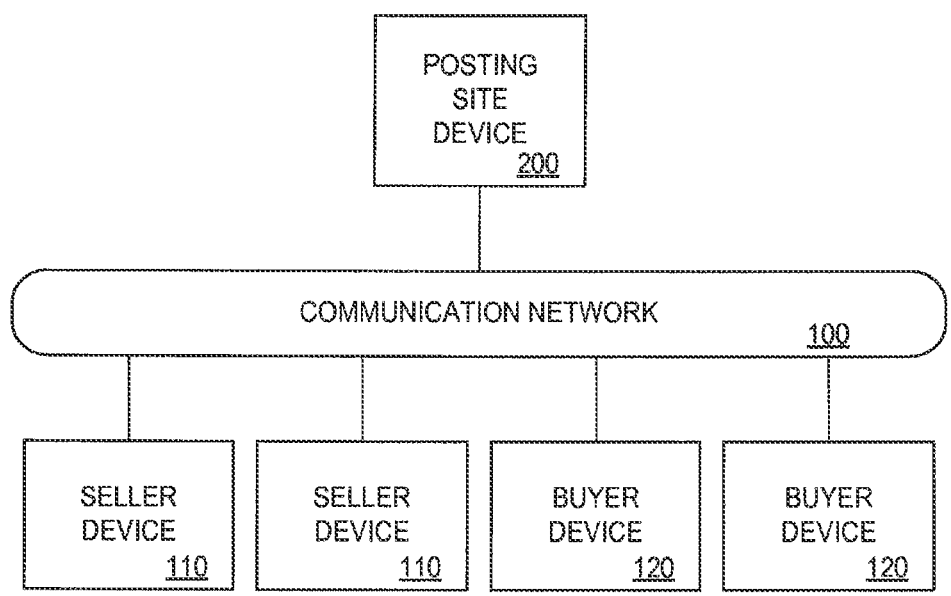
FIG. 1 is a block diagram overview of a system for determining a posting payment amount according to an embodiment of the present invention.

The present invention is directed to products and processes for determining a posting payment amount, which is an amount to pay in exchange for a post, including but not limited to a posting of an item for sale, a resume or a personal description. Turning now in detail to the drawings, FIG. 1 is a block diagram overview of a system for determining a posting payment amount according to an embodiment of the present invention. The system includes a number of seller devices 110 and buyer devices 120 coupled to a posting site device 200 through a communication network 100. The seller devices 110 and the buyer devices 120 may be, for example, Personal Computers (PCs), Personal Digital Assistants (PDAs), wired or wireless telephones, or any other appropriate communication device. The communication network 100 may be, for example, a Local Area Network (LAN), a Wide Area Network (WAN), a wireless network, a Public Switched Telephone Network (PSTN), or an Internet Protocol (IP) network such as the Internet, an intranet or an extranet. In one embodiment, seller PCs and buyer PCs may communicate with a Web-based posting site server through the Internet 100.

According to an embodiment of the present invention, the posting site device 200 determines a posting payment amount based on information received about a post for an item to be sold. Consider a seller who wishes to sell an item. As used herein, an "item" may comprise, for example, any good or service, such as a second-hand consumer electronic device. Other examples of items include hotel rooms, car rental services, concert and other event tickets, new merchandise, and second-hand products, such as collectibles.

The seller may use a seller device 110 to send, through the communication network 100, information about the item to be sold. The seller may transmit to the posting site device 200 one or more of: the seller's identity; the type of item to be sold; the condition of the item; peripherals included with the item; and a "floor price," i.e., a price below which the item will not be sold.

According to an embodiment of the present invention, the posting site device 200 determines, based on the received information, a "posting payment amount." As used herein, a "posting payment amount" may comprise, for example, an amount of money to be paid to the seller in return for posting the item to be sold.

According to other embodiments of the present invention, the posting payment amount may be negative, that is the seller may pay money to the posting site in return for posting the item, or may comprise a series of payments, such as payment for every ten bids received for the item.

If the posting site wishes to encourage posts for a certain type of item, the posting payment amount may be based on the type of item being sold. For example, to promote posts for cameras, the posting site device may determine higher posting payment amounts for cameras and lower posting payment amounts for e.g. computer equipment.

The posting site may offer a posting payment amount to someone in exchange for posting feedback. For example, a posting payment amount may be offered in exchange for posting feedback regarding (i) a previously purchased product, (ii) a buyer to whom something has been sold, and/or (iii) a seller from whom something was purchased.

In various embodiments, it can be advantageous to offer a posting payment amount in exchange for posting feedback. For example, paying in exchange for posting feedback can reduce or eliminate statistical bias in the feedback that is provided.

If people are allowed to submit feedback but are not compensated when they do so, certain types of feedback (e.g. extremely positive or extremely negative) are more likely to be offered, while other types of feedback (e.g. neutral, weakly positive or weakly negative) are unlikely to be provided without some compensation. In addition, if people are allowed to submit feedback but are not compensated when they do so, less feedback will be posted, and the same small subset of people will tend to provide such feedback.

The posting site may offer a posting payment amount to someone in exchange for providing information regarding what the person has that may potentially be auctioned, sold or posted. For example, a person may be provided with a posting payment amount in exchange for posting a list of three items owned by the person, or a list of four items the person is willing to sell.

In one embodiment, there are restriction on what qualifies for payment. For example, (i) information regarding at least a minimum number of items may be required; (ii) at least a minimum estimated sale value of the items in aggregate, or of each item, may be required; (iii) the item must have a certain minimum condition; (iv) item must be available for immediate sale or sale before a certain time; and/or (v) the item must not be of a certain type (e.g. tobacco, firearms, illegal substances). Many other restrictions will be apparent to those of ordinary skill in the art.

In one embodiment, the posting site presents a list of desired items, and the person is prompted to select which, if any, the person possesses that may potentially be auctioned, sold or posted. In one embodiment, the posting site allows the person to otherwise indicate the desired items the person possesses that may potentially be auctioned, sold or posted. For example, various Web pages may indicate items posted by others. Such Web pages may include graphical controls (e.g. buttons, hyperlinks) which allow the person to indicate that the item on the Web page is similar or identical to an item the person possesses that may potentially be auctioned, sold or posted.

Payment for providing information may be provided at various times, for example after such information is provided, after such information is verified, after the product is posted, and/or after the product is sold.

The amount of the posting payment amount which is provided in exchange for information may be based on, e.g., the characteristics of the item, as described herein.

The posting site may offer a posting payment amount to someone in exchange for a commitment to post subsequently. Various restrictions may be applied, such as requiring (i) at least a minimum number of posts, (ii) posts of only certain types (e.g. posts for books for sale), (iii) posts within a certain period of time, and (iv) posts of items for sale for at least a minimum price.

The posting site may also monitor for compliance. For example, if two posts within six months was required of a person, the posting site may determine whether the person provided two posts within six months. Noncompliance may result in various penalties, including but not limited to financial penalties charged to the person, preventing the person from posting, preventing the person from using the posting site, preventing the person from performing certain functions on the posting site, and/or providing third parties with an indication of the persons noncompliance.

The posting site may offer a posting payment amount to someone in exchange for using a preferred method of payment, such as payment using an AMERICAN EXPRESS™ credit card or PAYPAL™.

The posting site may offer a posting payment amount to someone in exchange for posting a resume with certain characteristics, such as particular job skills or job experience. Similarly, the posting site may offer a posting payment amount to someone in exchange for posting, with a dating service, a personal profile that includes certain characteristics, such as a predetermined income or marital status. The posting site may employ various means for ascertaining whether the posting is inaccurate or untruthful, and reduce or withhold payment accordingly. For example, the posting site may solicit feedback from others regarding the accuracy or veracity of posted information.

The posting site may offer a posting payment amount to someone in exchange for posting a predetermined number of posts (e.g. at least fifty posts) and/or within a predetermined time period (e.g. within three months).

According to another embodiment of the present invention, the posting site may want to encourage sellers to use reasonable floor prices. For example, if a floor price is too high, the item may never be sold and the posting site will not collect a commission. Therefore, the posting site device 200 may offer a higher posting payment amount if the seller has selected a reasonable floor price. Similarly, the posting site device 200 may use other parameters to determine a posting payment amount, such as a profit to be made by the posting site if the item is sold.

According to another embodiment of the present invention, the posting site may base the posting payment amount on previous posts provided by the seller. For example, the posting payment amount may be determined based on: how quickly items previously posted by the seller have been sold; the number of the seller's pending or current posts; or the number of bids submitted in response to the seller's previous posts. The reputation of the seller may also be used to determine the posting payment amount, according to another embodiment of the present invention.

In accordance with the present invention, the information about the post for the item to be sold may include account information such as a financial account identifier that identifies an account of the seller to be credited or debited. For example, the seller may provide credit, debit, Automated Teller Machine (ATM), or "smart" card information to the posting site device 200. This information can then be used to electronically provide the posting payment amount to the seller. The posting payment amount may be provided to a seller, for example, when the item is posted, when a bid is received for the item, or when the item is sold.

In an alternate embodiment the payment posting amount may be provided to a party other than the seller. In such an alternate embodiment, the seller provides to the posting site a financial account identifier that identifies an account of a party other than the seller. The other party may comprise an individual or an organization such, as a charity, whom the seller desires to benefit from the sale of the item. For some sellers, the benefit to the other party is just as motivating, or more motivating than a comparable benefit to themselves.

According to another embodiment of the present invention, the determination of a posting payment amount may be "automatically" performed by the posting site device 200. As used herein, the terms "automatic" and "automatically" refer to actions that are not performed in an entirely manual way. According to another embodiment of the present invention, the determination may be made manually, on an ad hoc basis, by an operator of the system. According to still another embodiment of the present invention, the determination may be "dynamically" performed by the posting site device 200. As used herein, the terms "dynamic" and "dynamically" refer to actions that are performed in substantially real-time.

When a seller agrees to post an item to be sold, the posting site device 200 makes the post known to potential buyers (e.g. by displaying via a buyer device). The posting device 200 may eventually arrange to the sell the item to a buyer that views the post using a buyer device 120. If so, the posting site device 200 can credit the seller's account appropriately and retain a commission. If desired, the posting payment amount may be deducted from the sale price or floor price. By way of example only, the posting site device 200 may pay to the seller one of: a winning bid amount; the bid amount minus the posting payment amount; a floor price; the floor price minus the posting payment amount; the floor price plus a percentage of the difference between the floor price and the bid amount; and the floor price, plus a percentage of the difference between the floor price and the bid amount, minus the posting payment amount.

Figure 2:
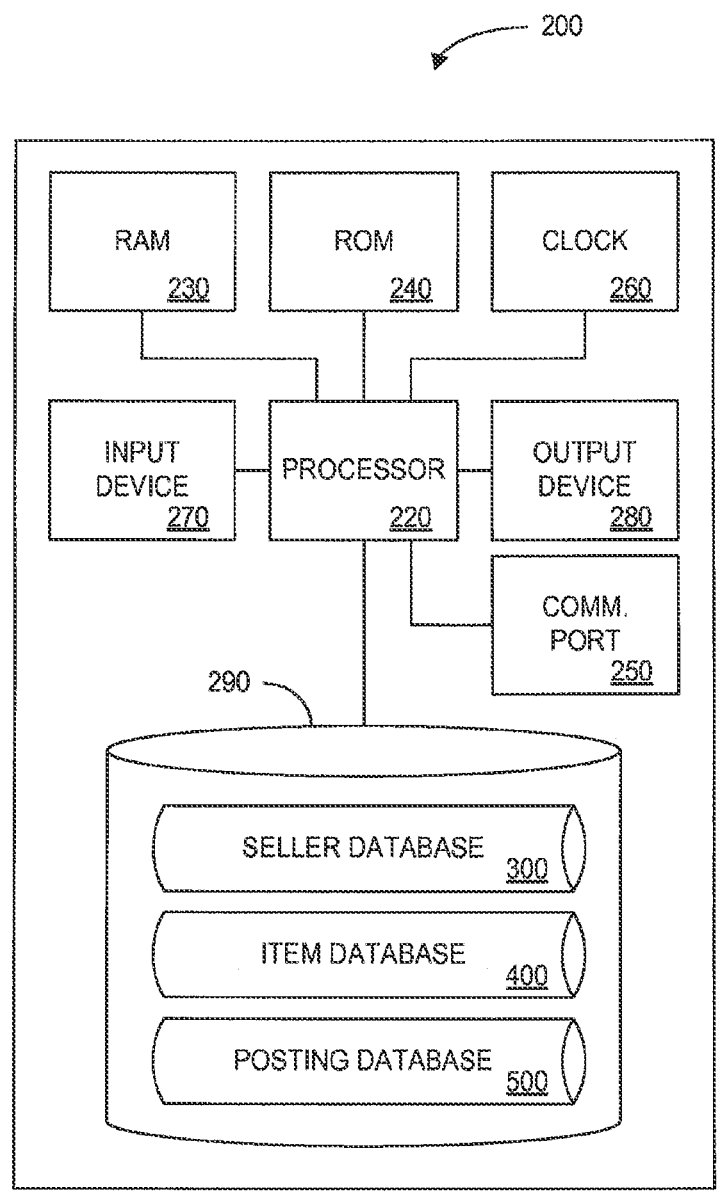
FIG. 2 is a block schematic diagram of the posting site device shown in FIG. 1 according to an embodiment of the present invention.

FIG. 2 is a block schematic diagram of the posting site device 200 shown in FIG. 1 according to an embodiment of the present invention. The posting site device 200 includes a processor 220 coupled to: a clock 260; a network communication port 250—which in turn is coupled to a network; and "memory units" comprising a Random Access Memory (RAM) 230 and a Read Only Memory (ROM) 240. An input device 270, an output device 280 and a storage device 290, such as a hard disk, are also coupled to the processor 220.

The memory units 230, 240 and/or the storage device 290 may store instructions adapted to be executed by the processor 220 to perform at least one embodiment of the present invention. For example, when information about a post for an item to be sold is received through the communication port 250, the memory units 230, 240 and/or the storage device 290 may store instructions adapted to be executed by the processor 220 to determine, based on the received information, a posting payment amount. Note that, as used herein, information may be "received" by, for example: (1) the posting site device 200 from a seller device 110; or (2) a software application or module within the posting site device 200 from another software application or module within the posting site device 200, or from any other source.

For the purposes of this application, the memory units 230, 240 and storage device 290 could include any medium capable of storing information and instructions adapted to be executed by a processor. Some examples of such media include, but are not limited to, floppy disks, CD-ROM, magnetic tapes, hard disks, and any other device that can store information, such as digital information. In one embodiment, instructions are stored on the medium in a compressed and/or encrypted format. As used herein, the phrase "adapted to be executed by a processor" is meant to encompass instructions stored in a compressed and/or encrypted format, as well as instructions that have to be compiled or installed by an installer before being executed by the processor.

Figure 3:
FIG. 3 is a tabular representation of a portion of the seller database shown in FIG. 2 according to an embodiment of the present invention.

As shown in FIG. 2, the storage device 290 contains a seller database 300, described in detail with respect to FIG. 3. The storage device 290 also contains an item database 400, described in detail with respect to FIG. 4, and a posting database 500, described in detail with respect to FIGS. 5, 6A, 6B and 7.

A more detailed description of one embodiment of the present invention will now be provided. As will now be described, information, such as the type of item being sold, the reputation of the seller, the condition of the item, and any peripherals included with the item, may be used to determine an appropriate posting payment amount. It will be apparent to those skilled in the art, however, that other values and embodiments may be implemented instead.

According to this embodiment, the posting site device 200 transmits a blank electronic Request To Sell (RTS) form to a seller device 110 through the communication network 100. The seller, using the seller device 110, enters information about a post into the RTS form and returns the form to the posting site device 200 through the communication network 100. The RTS form may be, for example, an HTML form transmitted through the Internet via a Web site. The completed RTS form may include the seller's identity, such as a user IDENTIFIER number, and the type of item being sold, such as "camera," The type of item being sold may further include an item "class" and "type," such as, for example, that the "camera" (class) being sold is made by a particular manufacturer (type). Further information regarding the item may be entered into the form as well.

The RTS may also include the seller's name and address, telephone number and a credit card number (or other means to provide funds to the seller and/or receive funds from the seller. If desired, the posting site device 200 can validate the corresponding credit card account before continuing the process. The credit card can be used to electronically credit posting payment amounts and sales, and to debit commissions, authentication charges, penalties and fees (such as shipping and handling fees) as desired.

The posting site device 200 then transmits a blank electronic Condition of Item Sheet (CIS) to the seller device 110. The CIS may ask the seller, for example, the condition of the item being sold (such as "mint," "good" or "poor") and what peripherals are included with the item. Note that the particular CIS may be selected based on the type of item described in the completed RTS form. For example, if the RTS form indicates that a camera is being sold, the CIS might request information regarding whether a zoom lens or a camera case is included along with the camera.

Based on the information received from the seller, i.e. on the RTS form and/or the CIS, the posting site device 200 can determine a reputation associated with the seller, such as by sending a query to the seller database 300. FIG. 3 is a tabular representation of a portion of the seller database 300 shown in FIG. 2 according to an embodiment of the present invention. As shown in FIG. 3, the seller database 300 has multiple data categories. For example, the seller database 300 may include a name 310 and a credit card number 320 associated with the seller. The credit card number allows the seller to easily receive the posting payment amount and/or proceeds from a sale. The seller database 300 may also include a number of satisfied buyers 330, a number of unsatisfied buyers 340 and a reputation percentage 350.

The first seller that is represented in FIG. 3 has completed nineteen sales with only a single unsatisfied buyer and is assigned a reputation of 94.7% as follows:

100*(number of satisfied customers)/(total number of sales)

On the other hand, the second seller has completed eight sales with two unsatisfied buyers and is assigned a reputation of 75%. In this case, a higher posting payment amount may be offered to the first seller as compared to the second seller, even when both are selling identical items. Moreover, the reputation of a seller may change the final selling price of an item—a seller with a poor reputation may receive few offers. Of course, if the seller has not previously sold an item, a new entry in the seller database 300 can be created and a "default reputation" percentage may be assigned.

Figure 5:
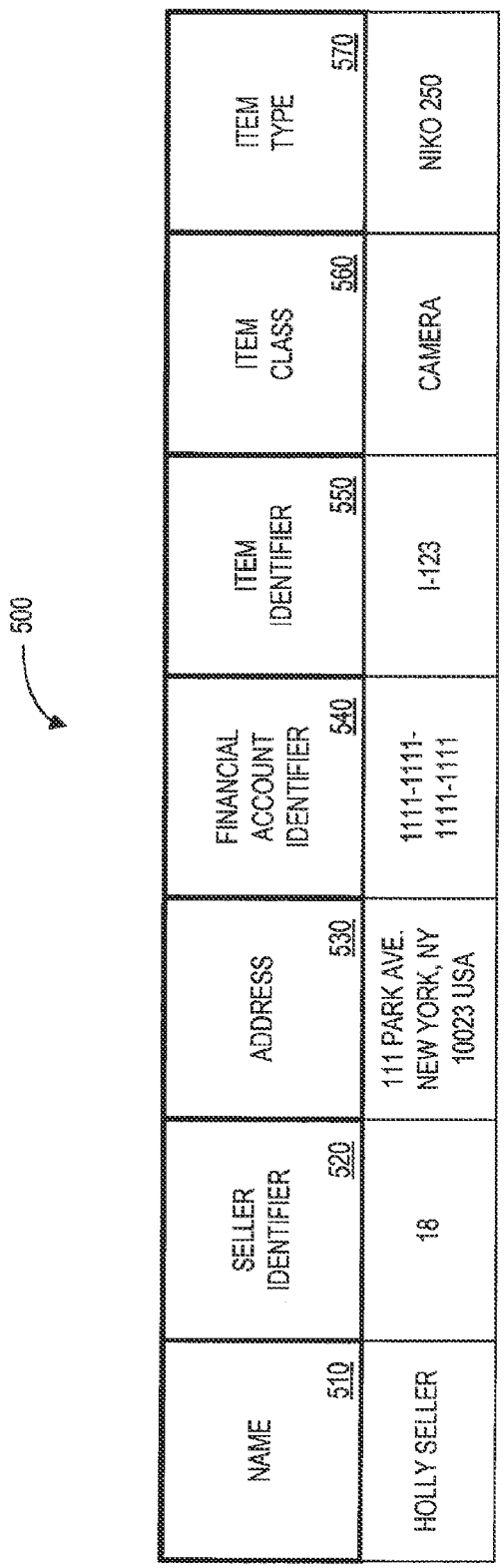
FIG. 5 is a tabular representation of a request to sell portion of the posting database shown in FIG. 2 according to an embodiment of the present invention.

Using the information received from the seller, the posting site device 200 creates an entry in the posting database 500. FIG. 5 is a tabular representation of a RTS portion of the posting database 500 shown in FIG. 2 according to an embodiment of the present invention. As shown in FIG. 5, the RTS portion includes a name 510, a seller identifier 520, an address 530, an account identifier 540, an item identifier 550, an item class 560 and an item type 570.

Based on the information in the posting database 500, the posting site device 200 can examine past posts for the same class and type of item, e.g. a camera made by a particular manufacturer. For example, FIG. 4 is a tabular representation of a portion of the item database 400 shown in FIG. 2 according to an embodiment of the present invention. As shown in FIG. 4, the item database 400 includes information about previous and current items or posts, comprising multiple data categories 410 (such as an item identifier and class) for multiple items 420 (such as items 1 through n). In this case, the value of the item to be posted can be estimated and used to determine a posting payment amount. The posting site device 200 may estimate the value of the item based on, by way of example only, sales during the past year for the item, the last fifteen similar items sold, or a trend analysis for sales of similar items. Advertisements for each item may be generated based on some of the information in the item database 400. For example, an HTML document may be generated to display the item description, peripherals and asking price if appropriate.

Figure 6A:
FIGS. 6A and 6B are tabular representations of a condition of item sheet portion and a condition pricing table of the posting database shown in FIG. 2 according to an embodiment of the present invention.
Figure 6B:

The condition of an item being sold may also be used to determine the expected value. FIGS. 6A and 6B are tabular representations of a CIS table 600 and a condition pricing table 650 of the posting database 500 shown in FIG. 2 according to an embodiment of the present invention. As shown in FIG. 6A, the CIS includes an item class 605, an item type 610, a year made 615 and an item condition 635. As shown in FIG. 6B, the condition pricing table includes a number of condition classes and associated price adjustments. In particular, the condition pricing table includes "mint" 655, "very good" 660, "good" 665, "OK" 670, "needs work" 675 and "poor" 680 condition classes and associated price adjustments. For example, a camera that would otherwise be expected to sell for $100, may be adjusted to have an expected selling price of $106 if it is in "very good" condition ("+$6"). There may be different condition of item tables for different items.

According to another embodiment of the present invention, the peripherals included with an item may be used to determine the expected selling price and/or the posting payment amount. For example, the expected selling price may be determined as follows:

expected selling price=base price+peripheral values, where the base price is the price the item usually sells for by itself. This base price is then adjusted based on the dollar value of each peripheral.

The condition of item sheet portion of the posting database 500 may include entries related to peripherals included with the item being sold. For example, as shown with respect to the camera in FIG. 6A, the peripherals include a case 620, a flash 625 and a tripod 630. FIG. 7 is a tabular representation of a peripheral pricing portion of the posting database 500 according to this embodiment of the present invention. The peripheral pricing table includes an item class 710, a peripheral one 720, a peripheral two 730 and a peripheral three 740. Notwithstanding the foregoing, any number of peripherals may be referenced. For example, a camera having a base price of $100 may be assigned an expected selling price of $130 if a case ("+$8") and a flash ("+22") are included.

Other values that may be used to determine the expected selling price and/or the posting payment amount include the seller's reputation and the number of similar items currently posted on the site. For example, a good reputation may increase the expected selling price, but a large number of similar items on the site may decrease the expected selling price.

If items in the same class, but not of the same type, have been previously posted or sold, the information about other posts in that class can be used to determine the value of the item. If no items of that type or class have previously been sold, a default value set by the posting site or the seller can be used.

An item posted with a floor price that is too high is less likely to sell, and less likely to sell quickly. An item posted with a floor price that is too low, however, may result in a reduced sale price to the seller and a reduced commission to the posting site. Therefore, the posting site and the seller both benefit from a reasonable floor price. By adjusting the posting payment amount, the posting site can encourage a seller to post an item using a reasonable floor price. One way this may be done is as follows:

floor price=(expected selling price)*(X%)*(Y%), where X is a percentage of the expected selling price used by the posting site to encourage people to purchase or bid for the item. Different item classes and types of items may have different values for X. Y represents a reputation score for the seller, as described with respect to FIG. 7.

According to another embodiment of the present invention, the seller is allowed to determine the floor price. The seller, may, for example, select a floor price from a range of floor prices suggested by the posting site. In this case, different floor prices can be associated with different posting payment amounts.

Figure 8:
FIG. 8 is a tabular representation illustrating a relationship between floor prices, previous posting information, and posting payment amounts according to an embodiment of the present invention.

FIG. 8 is a tabular representation 800 illustrating a relationship between floor prices, previous posting information, and posting payment amounts according to an embodiment of the present invention, As shown in FIG. 8, the historic sales 820 of the item indicate that similar items sell 80% of the time if the floor price 810 is set to $200. That same item may sell 65% of the time if the floor price 810 is set to $250 and 40% of the time if the floor price 810 is set to $300. The commission percentage 830 and/or the posting payment amount 840 may therefore be adjusted, based on the floor price 810 selected by the seller, to encourage a reasonable value. For example, the posting payment amount 840 may be reduced from $6.25 to $2.00 if the seller insists on a floor price 810 that significantly reduces the chance that the item will be sold.

According to one embodiment of the present invention, a table such as the one shown in FIG. 8 is displayed to the seller to allow the seller to select his desired floor price and corresponding posting payment amount. According to another embodiment of the present invention, the posting site device 200 lets the seller select a floor price, but suggests, or counter-offers with, a different floor price to the seller, perhaps with a higher posting payment amount. The seller can instead be given historical data so he can better determine a reasonable floor price. Such services may be provided to the seller for an additional fee, if desired.

According to another embodiment of the present invention, the system determines the posting payment amount based on the expected value of the item to be sold, without regard to the floor price. In this case, the expected value, and therefore the posting payment amount, may or may not be adjusted based on, for example, the type of item being sold, the value of similar items that have been sold, the reputation of the seller, the condition of the item and the peripherals included with the item.

According to another embodiment of the present invention, the posting payment amount may be a negative value. For example a seller with a poor reputation may be charged to post items for sale.

According to another embodiment of the present invention, a first-time seller may be paid more, or less, than a seller who has posted before. Similarly, a seller that frequently posts items for sale, or that currently has a large number of items posted for sale, may be paid more, or less, than a seller that infrequently posts items. A seller who has been profitable for the posting site may be paid more than a seller who has not. For example, a seller who has posted items that have sold quickly may be paid more than a seller who has posted items that have not sold quickly or at all.

According to still another embodiment of the present invention, the posting payment amount may be determined based on the number of bids received for that post, or for other posts previously submitted by the seller. For example, the posting payment amount may be $1.00 for every one hundred bids, In this case, the posting payment amount may be incrementally paid to the seller, $1.00 at a time. Similarly, different classes of posting payment amounts may be created, such as: ten bids 3% increase in posting payment amount; twenty bids=5% increase in posting payment amount.

In addition, the posting amount may be contingent on receiving a certain minimum number of bids, or minimum bid price. Similarly, it may be required that the bids meet certain restrictions. For example, a bid must be at least a predetermined amount higher than the previous bid, and must be received from a different person that the previous bid.

According to another embodiment of the present invention, the posting payment amount may be a modified commission arrangement. For example, if the posting site typically charges a 10% commission on a sale, the site may charge a 9% commission if a reasonable floor price is selected by the seller.

The posting payment amount may be determined based on the novelty of the item or of the post. In one embodiment, a post of an item for sale is compared with previously sold items of the same or similar kind. The posting payment amount may be set greater for relatively novel items, if it is desirable to promote novel items. For example, the posting payment amount may be calculated in accordance with the following formula;

$$PPA=K(A-N)$$

in which:
 PPA is the posting payment amount
 K is a constant
 A is a constant
 N is the number of previously sold items of the same or similar kind
As is apparent, in this formula PPA increases as N decreases.
 Conversely, the posting payment amount may be set lower for relatively novel items, if it is desirable to discourage novel items or promote items similar to those already posted. For example, the posting payment amount may be calculated in accordance with the following formula:

$$PPA=K(N-A)$$

in which:
 PPA is the posting payment amount
 K is a constant
 A is a constant
 N is the number of previously sold items of the same or similar kind
As is apparent, in this formula PPA increases as N increases. It can be advantageous to impose restrictions on the range of values PPA may assume. For example, if the formula yields PPA >$15 for a particular value of N, then PPA may be set to $15.

The posting payment amount for a person may be determined based on the number of previous posts by that person, in one embodiment, the posting payment amount may be set greater for relatively fewer posts, if it is desirable to promote posting by people with few or no prior posts. For example, the posting payment amount may be calculated in accordance with the following formula:

$$PPA=K(A-N)$$

in which:
 PPA is the posting payment amount
 K is a constant
 A is a constant
 N is the number of previous posts by the person.
As is apparent, in this formula PPA increases as N decreases. It can be advantageous to impose restrictions on the range of values PPA may assume. For example, if the formula yields PPA <0 for a particular value of N, then PPA may be set to zero.

In a like manner, the posting payment amount may be determined based on other factors such as the weight of an item posted for sale.

The posting payment amount may also be based on (i) the final sale price of an item being sold (e.g. $5 if sale price <$100, $10 if sale price >$100), (ii) the commission received for selling the item, (iii) a retail price of an item for sale, and/or (iv) the number of people who view the post.

It can be advantageous to impose restrictions on the range of values PPA may assume. For example, PPA may be set to be no less than zero and/or no more than $100.

According to another embodiment of the present invention, the posting site may only offer a posting payment amount if the seller indicates an acceptance of modified received information. For example, if the posting site typically sells an item for $80, and a seller posts a similar item with a floor price of $100, the posting site may offer him a payment posting amount in exchange for agreeing to reduce the floor price for the post. Of course, a combination of modified commission arrangements and advance payment amounts may be used to encourage potential sellers.

Note that embodiments of the present invention have been described with respect to, by way of example, transactions transmitted using a Web site. According to other embodiments of the present invention, information may instead be sent using, for example, a telephone, a facsimile machine, e-mail, a Voice Response Unit (VRU), an Interactive VRU, a WebTV interface, or a cable television network interface.

After the posting payment amount is determined, the item may be posted by the posting site device 200 (such as by adding the item to the item database 400, and displaying advertisements for the items that are in the item database) and the posting payment amount may be credited to the seller's account.

Payment for posting may alternatively or additionally comprise credit for other purchases. In one embodiment, payment for posting may be deposited into an account which may only be used to pay for items sold via the posting site. In one embodiment, payment for posting may comprise a coupon redeemable for merchandise from a particular merchant or set of merchants.

Payment for posting may alternatively or additionally comprise an amount applied to the sale price of an item the person has posted for sale. In one embodiment, the posting site may reduce the price of the sale price of the item and pay the person the difference. In another embodiment, the posting site may add an amount to the highest bid in an auction for an item for sale. Thus, the payment rendered for the item would include payment rendered by the highest bidder plus the posting payment amount, it may be advantageous to only add an amount to the highest bid when the highest bid is below a predetermined amount, thereby guaranteeing a minimum sale price for the item.

In one embodiment, a seller may request to sell an item and provide item information (e.g., condition, other features required to describe the item). The posting site displays a minimum sale price for the item (e.g., $10). The item is posted for sale in an auction format, and one or more bids for the item are received. Each bid includes a bid amount, and the bid with the highest bid amount (e.g., $8) at the end of the auction is deemed the winner. The winning bid amount (e.g., $8) is forwarded from the winner to the owner of the item, along with an additional amount (e.g., $2) if the winning bid amount is less than the minimum sale price. For example, the owner's credit card account or other account may be credited an amount of funds (e.g., $10) in one or more transactions. Thus, the owner is paid more than the winning bid amount in exchange for the item.

Guaranteeing a minimum sale price for an item may be based on information regarding the item, including but not limited to the expected selling price, and the expected time until the item is sold.

Payment for posting may alternatively or additionally comprise featuring the post prominently.

Figure 9:
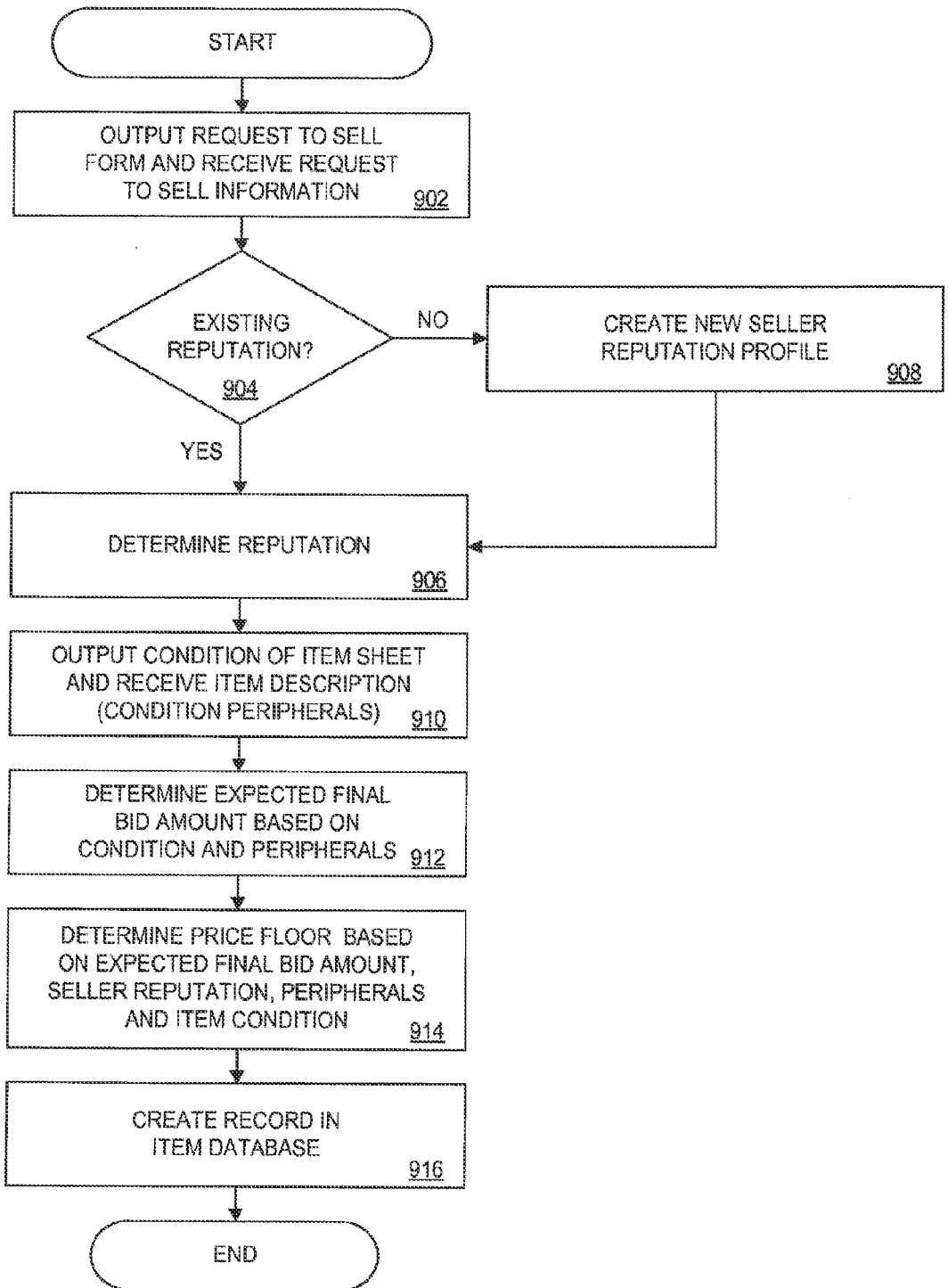
FIG. 9 is a flow chart illustrating a method for receiving a request to sell an item according to an embodiment of the present invention.

FIG. 9 is a flow chart illustrating a method for receiving a request to sell an item according to an embodiment of the present invention. The flow chart in FIG. 9, as well as the other flow charts discussed herein, are not meant to imply a fixed order to the steps; an embodiment of the present invention can be practiced in any order that is practicable. At 902, a blank RTS form is output and a completed RTS form is received by the posting site device, including, for example, an item class and type, the seller's name and financial account information as specified by the seller. If the seller has an existing reputation score with the posting site at 904, the reputation is determined at 906. If the seller does not have an existing reputation score at 904, a new seller profile is created at 908.

At 910, a blank CIS is output and a completed CIS is received by the posting site device, including, for example, the condition of the item and any peripherals included with the item. An expected selling price (or expected final bid amount in the case of an auction) is determined at 912, such as by examining past sales for similar items and adjusting for the condition of the item and the peripherals included with the item. An appropriate floor price is determined at 914, based on the expected selling price and reputation of the seller, and a record for the item is created in a database at 916.

Figure 10:
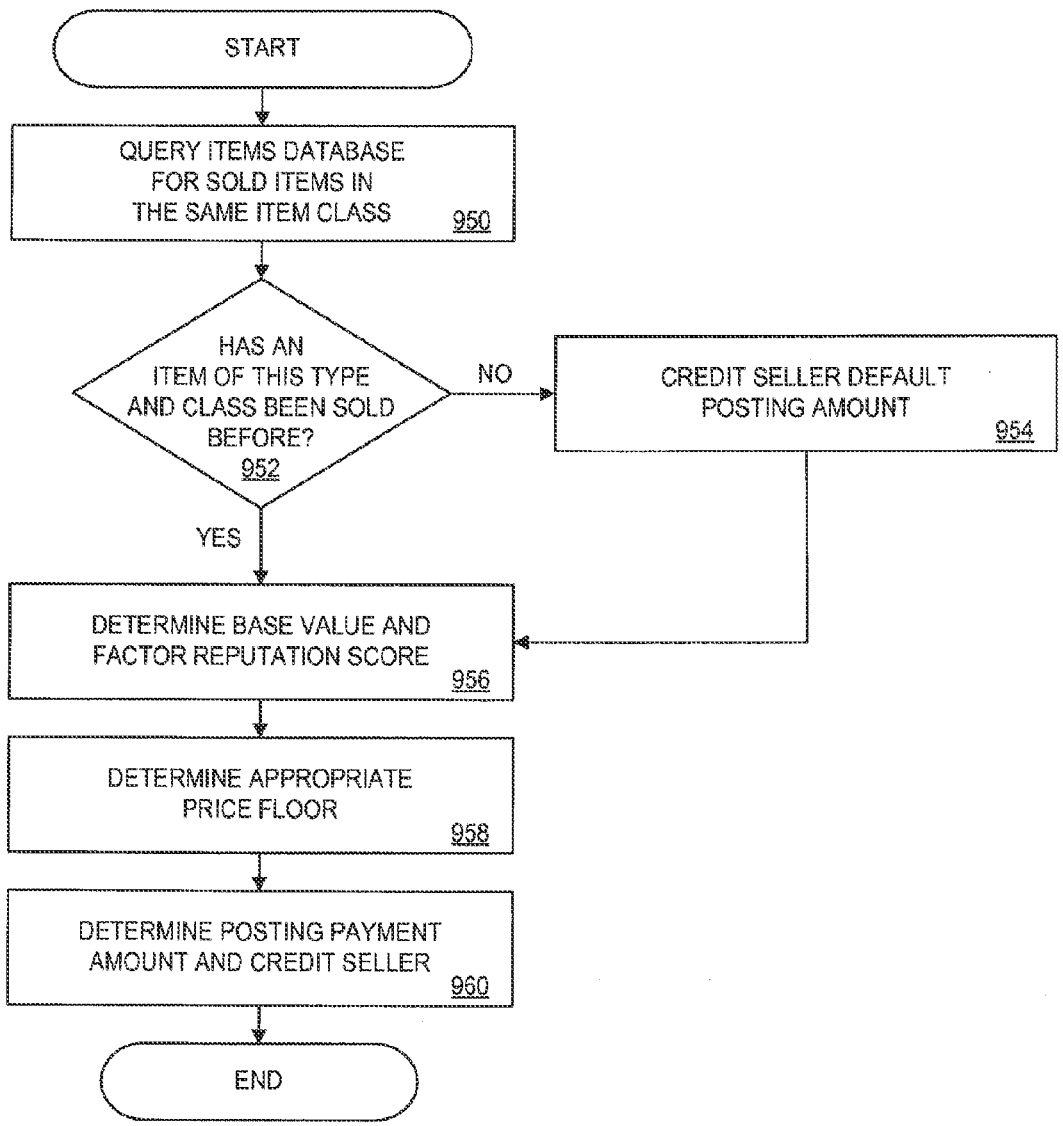
FIG. 10 is a flow chart illustrating a method for determining a posting payment amount according to an embodiment of the present invention.

FIG. 10 is a flow chart illustrating a method for determining a posting payment amount according to an embodiment of the present invention. The process may be executed, for example, when an RTS form and/or a CIS is received by a posting site device. A database is queried at 950 to find items of the same or similar class and type. If it is determined that an item of the same or similar type and class has not been sold before at 952, a default posting payment amount may be credited to the financial account specified by the seller at 954.

If it is determined that an item of the same or similar type and class has been sold before at 952, a base amount, weighted for the condition of the item and peripherals included with the item, is determined and adjusted based on the reputation of the seller at 956. An appropriate floor price is determined at 958 and a posting payment amount is determined and credited to the seller at 960.

The posting site may offer a posting payment amount to someone who is known or suspected to have something which may potentially be posted.

In one embodiment, where a buyer has purchased an item (e.g. through an auction or through a classified advertisement), the buyer may be offered a posting payment amount to post that item for sale. In an embodiment where the item is purchased via the posting site, or via a site which may send item information to the posting site, the posting site may be able to readily determine information including, but not limited to, (i) the price paid for the item, (ii) the identity of the buyer, (iii) whether payment for the item has been rendered yet, (iv) a financial account, if any, used in rendering payment.

For example, a buyer may win an auction for an item, and be offered a posting payment amount (either before or after payment has been rendered) in exchange for putting the item up for auction on the posting site or on another site.

Such an embodiment is especially advantageous if the posting site can determine that there is a significant difference between the actual selling price of the item and a subsequent (expected or likely) selling price of the item. An expected or likely sale price may be determined based on prior sales of similar or identical items, as well as based on prior bids on similar or identical items. An expected or likely sale price may also be determined based on information derived from other sources of sale prices, such as product catalogs, expert estimates and the like.

The posting site may offer a posting payment amount upon request. In one embodiment, a Web page may permit entry of data that identifies an item (e.g. an ISBN number of a book). The posting site can receive this data and respond with the posting payment amount that would be paid if such an item was posted. Such an embodiment permits people to check whether it would be in their interests to post.

In another embodiment, a web site may have a plurality of items for sale, such as books or electronics. Each item may be identified by, for example, displaying the item on a Web page or a portion of a Web page. For each displayed item, various types of information may be provided (e.g., price of item, condition of item, item details).

For each displayed item, controls (e.g., buttons, hyperlinks) may be provided that allow entry of data or commands (e.g., when a button or hyperlink is clicked on or otherwise actuated), which are typically received and processed by a Web server. For example, a Web page displaying a particular item may allow a user to (i) purchase the item, (ii) add the item to a list of items that are desired by the user, and (iii) indicate that the user has the item available for sale. A Web page displaying a particular item may also allow a user to indicate that the user requests the posting payment amount that would be paid if such an item was posted. Upon receiving such a command, the posting site device may respond by calculating and displaying the posting payment amount on the Web page or on another Web page.

It can be advantageous to hinder or prevent people from unscrupulously receiving posting payment amounts. For example, if the posting payment amount is based on the sale price of an item, it may be desirable to prevent a person from purchasing his own item, thereby preventing manipulation of the sale price of the item. Similarly, if the posting payment amount is based on the bids received for an item, it may be desirable to prevent a person from bidding on his own item, thereby preventing manipulation of the number or type of bids received for the item. Similarly, if the posting payment amount is based on the reputation of a person posting, it may be desirable to prevent that person from manipulating his reputation by, e.g. submitting positive feedback about himself.

The present invention has been described in terms of several embodiments solely for the purpose of illustration. Persons skilled in the art will recognize from this description that the invention is not limited to the embodiments described, but may be practiced with modifications and alterations limited only by the spirit and scope of the appended claims.

Further, although the examples herein are described for clarity, those skilled in the art will understand how to make any changes, if necessary, to the above-described apparatus and methods to accommodate these and other embodiments and applications.

The seller devices and/or the buyer devices may perform some or all of the described functions of the posting site device. Similarly, the posting site device may perform some or all of the described functions of the seller devices and/or the buyer devices.

Information need not be displayed via a Web page, and need not be displayed at all. For example, the information may be displayed via any other means for displaying such information. Information may be displayed on a handheld device (e.g., PDA, cell phone), printed (e.g., with a printer), or output in audio or verbal form (e.g., via a speaker, via voice synthesis software).

What is claimed is:

1. Apparatus, comprising:
    a processor;
    a communication port coupled to the processor; and
    a storage device operatively coupled to the processor and containing instructions configured to direct the processor to:
        receive posting information for a post relating to an item to be sold via a posting site;
        determine a posting payment amount relating to the post including determining the posting payment amount—in response to receiving the posting information; and
        provide the posting payment amount in exchange for the posting information, the posting payment amount being provided as a credit for purchases.

2. The apparatus of claim 1, wherein the credit for purchases is a credit usable for purchases via the posting site.

3. The apparatus of claim 1, wherein the credit for purchases is a coupon redeemable for merchandise from a particular merchant.

4. The apparatus of claim 2, wherein the credit is deposited into an account usable for purchases via the posting site.

5. The apparatus of claim 4, wherein the posting information includes account information identifying the account usable for purchases by the posting site.

6. The apparatus of claim 5, including instructions configured to direct the processor to validate the account information.

7. The apparatus of claim 5, wherein the account information identifies an account of a seller of the item.

8. The apparatus of claim 5, wherein the account information identifies an account of a party other than a seller of the item.

9. The apparatus of claim 5, including instructions configured to direct the processor to provide the posting payment amount using the account information.

10. The apparatus of claim 1, wherein the posting payment amount is responsive to the post for the item being posted.

11. The apparatus of claim 1, wherein the posting payment amount is responsive to the item being sold.

12. The apparatus of claim 1, wherein the posting payment amount is responsive to a bid being received for the item.

13. The apparatus of claim 1, wherein the posting payment amount is a positive amount that is paid to an entity from which the posting information about the post is received.

14. The apparatus of claim 1, wherein the posting payment amount is a negative amount that is paid from an entity, from which the posting information about a post is received, to a posting site.

15. A method comprising:
    receiving posting information for a post relating to an item to be sold via a posting site;
    using at least one processor, determining a posting payment amount relating to the post including determining the posting payment amount—in response to receiving the posting information; and
    providing the posting payment amount in exchange for the posting information, the posting payment amount being provided as a credit for purchases.

16. The method of claim 15, wherein the credit for purchases is a credit usable for purchases via the posting site.

17. The method of claim 15, wherein the credit for purchases is a coupon redeemable for merchandise from a particular merchant.

18. The method of claim 16, wherein the credit is deposited into an account usable for purchases via the posting site.

19. The method of claim 18, wherein the posting information includes account information identifying the account usable for purchases by the posting site.

20. The method of claim 19, including validating the account information.

21. The method of claim 19, wherein the account information comprises at least one of the debit and credit card information.

22. The method of claim 19, wherein the account information identifies an account of a seller of the item.

23. The method of claim 19, wherein the account information identifies an account of a party other than a seller of the item.

24. The method of claim 19, including providing the posting payment amount using the account information.

25. The method of claim 15, wherein the posting payment amount is responsive to the post for the item being posted.

26. The method of claim 15, wherein the posting payment amount is responsive to the item being sold.

27. The method of claim 15, wherein the posting payment amount is responsive to a bid being received for the item.

28. The method of claim 15, wherein the posting payment amount is a positive amount that is paid to an entity from which the posting information about the post is received.

29. The method of claim 15, wherein the posting payment amount is a negative amount that is paid from an entity, from which the posting information about a post is received, to a posting site.

30. A non-transitory computer readable medium storing instructions configured to direct a processor to:
- receive posting information for a post relating to an item to be sold via a posting site;
- determine a posting payment amount relating to the post including determining the posting payment amount—in response to receiving the posting information; and
- provide the posting payment amount in exchange for the posting information, the posting payment amount being provided as a credit for purchases.

\* \* \* \* \*